UNITED STATES PATENT OFFICE.

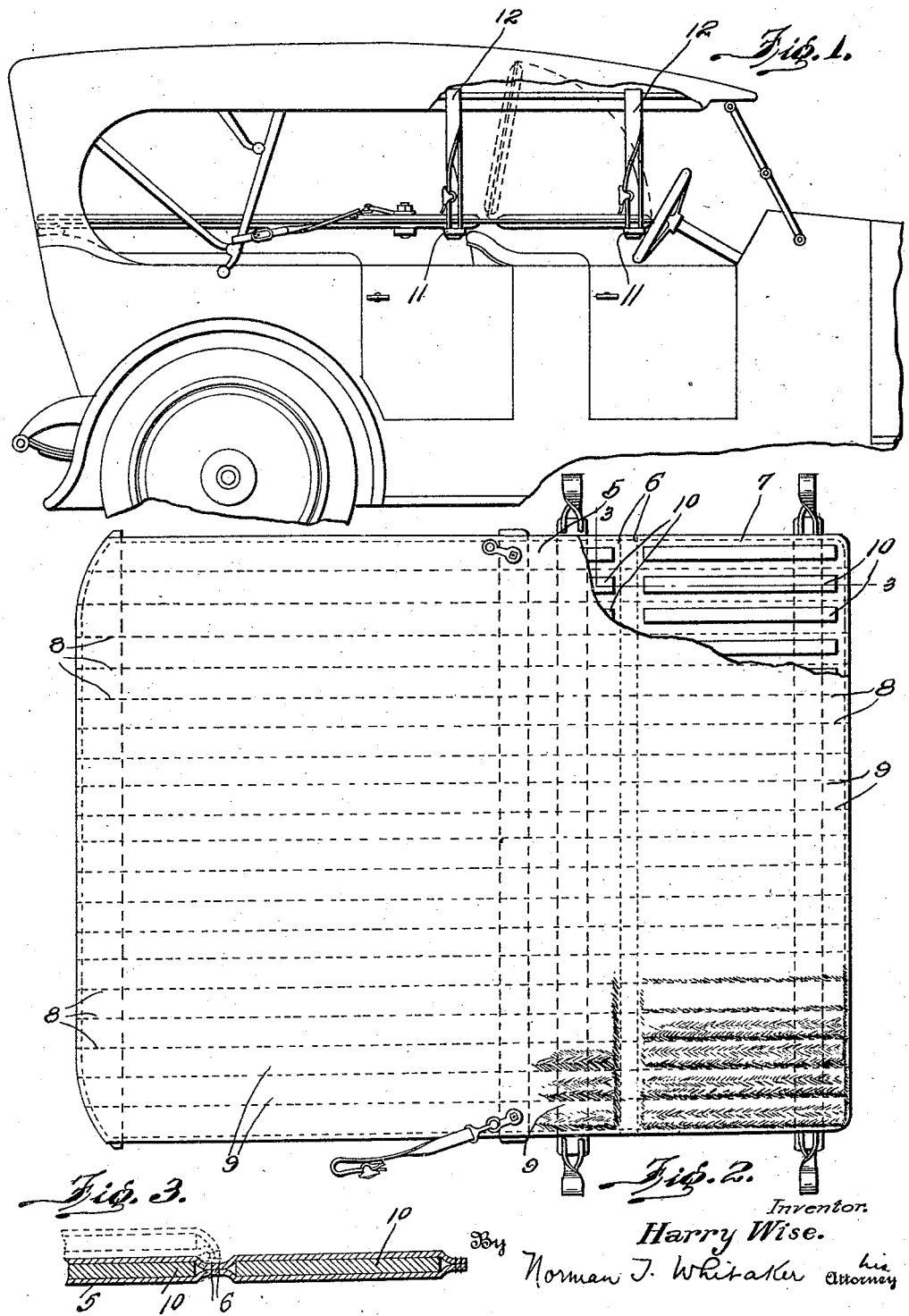

HARRY WISE, OF YAKIMA, WASHINGTON.

AUTOMOBILE BED.

1,420,800. Specification of Letters Patent. Patented June 27, 1922.

Application filed June 7, 1921. Serial No. 475,794.

*To all whom it may concern:*

Be it known that I, HARRY WISE, a citizen of the United States, and a resident of Yakima, in the county of Yakima and State of Washington, have invented a new and useful Automobile Bed, of which the following is a specification.

My invention relates to automobile beds and embodies improvements in my patent for automobile bed, issued March 15, 1921, No. 1,371,830.

The specific object of the invention is to provide an automobile bed which includes a flexible mattress which may be rolled up when not in use and when extended is capable of being folded transversely upon itself at one end to permit the driver to sit comfortably in the driver's seat without interference of the bed.

With the preceding and other objects and advantages in mind, as will become apparent from the following disclosure, the invention consists of the novel combination of elements, construction and arrangement of parts and operations to be hereinafter set forth, claimed and illustrated in the accompanying drawing, wherein:

Figure 1 is a side elevation of an automobile having a bed associated therewith, the dotted lines showing the forward end being folded upon itself;

Figure 2 is a plan view of the bed; and

Figure 3 is a longitudinal sectional view taken on line 3—3 of Figure 2, the dotted lines indicating the forward end of the bed folded upon itself.

Referring in detail to the drawing wherein similar characters of reference designate similar parts throughout the several views, the numeral 5 designates a fabric covering or casing provided with a double row of transverse stitching 6 adjacent one end to afford a hinged section 7. The casing 5 is stitched longitudinally as at 8 to afford a plurality of spaced pockets 9, and received in each of these pockets is a bar or slat 10. The flexible covering and the slats 10 constitute the bed which is adapted to be supported upon the automobile as shown in Figure 1 by means of bars 11 arranged beneath the casing 5 adjacent the hinged joint or stitching 6 and the forward end of the section 7, these bars being suspended from straps 12 secured to the frame of the top of the automobile and are identical to the supporting elements set forth in the patent above mentioned.

It will be obvious that, with the bed in extended position, the extension 7 may be folded upon itself to permit the driver to sit at the steering wheel to operate the automobile.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

An automobile bed comprising a flexible casing stitched transversely adjacent one end to afford a main bed section and a hinged end section, stiff longitudinal elements arranged in each section and having their opposed ends disposed upon opposite sides of the stitching whereby to permit the hinged end section to be folded on the main bed section, and means for supporting the bed sections in a horizontal plane in the automobile when in use.

. HARRY WISE.